United States Patent [19]

King

[11] 4,223,466
[45] Sep. 23, 1980

[54] FISHING APPARATUS

[76] Inventor: Johnnie L. King, Rte. 1, Box 320, Wagarville, Ala. 36585

[21] Appl. No.: 5,869

[22] Filed: Jan. 23, 1979

[51] Int. Cl.³ .............................. A01K 87/00
[52] U.S. Cl. ...................... 43/18 R; 43/24; 43/26.1
[58] Field of Search ............... 43/4.5, 4, 18 R, 24, 43/25, 261, 42.06

[56] References Cited

U.S. PATENT DOCUMENTS

| | | | |
|---|---|---|---|
| 2,583,660 | 1/1952 | Moore | 43/25 |
| 2,624,145 | 1/1953 | Wehn | 43/25 X |
| 2,781,602 | 2/1957 | Warford | 43/24 |
| 2,796,605 | 6/1957 | Ashley | 43/26.2 |
| 3,269,049 | 8/1966 | Emmons | 43/23 |
| 3,478,460 | 11/1969 | Kimble | 43/4.5 |
| 3,500,570 | 3/1970 | Hubbard | 43/18 R |
| 3,798,223 | 3/1974 | Watters | 43/42.06 |
| 3,862,509 | 1/1975 | Petersen | 43/18 R X |
| 3,981,095 | 9/1976 | Shepherd | 43/24 |

FOREIGN PATENT DOCUMENTS 2748188  3/1979  Fed. Rep. of Germany .......... 43/42.06

Primary Examiner—Nicholas P. Godici
Attorney, Agent, or Firm—Donal B. Tobin

[57] ABSTRACT

A fishing apparatus is disclosed which employs a hollow fishing rod into and through which is pumped air by means of a battery operated pump connected to the butt end of the hollow rod by means of a hose. The air is discharged from the rod through a perforated tube attached to the end of the rod. When the air passes through the perforated tube, bubbles will be created to aerate the water and attract the fish. The pump may be activated by means of a switch located on the fishing pole grip. The fisherman may place the pole under the water and activate the switch to force air through the perforated tube at the end of the pole to create a diversion to attract the fish. A fishing lure is attached to a single action reel by means of a fishing line.

11 Claims, 5 Drawing Figures

FISHING APPARATUS

BACKGROUND OF THE INVENTION

The present invention relates to a fishing apparatus and, more particularly, to a fishing apparatus employing a hollow fishing rod through which air is pumped to be discharged through a perforated tube at the end of the rod to produce bubbles aerating the water to create a disturbance under the water to attract fish.

It is well known that fish are often attracted to a promising feeding spot by a disturbance in the water such as bubbles or a small splash. The fish is apt to interpret the disturbance as indicating the presence of a smaller fish feeding near the site of the disturbance. When one casts a fishing lure into the water, the splash that occurs when the lure hits the water will often attract a fish to the fishing lure. Skilled fly fishermen develop a technique of maneuvering the fly about and on the surface of the water in such a way as to simulate the natural activity of an insect around the surface of the water and attract a fish.

Many artificial devices have been used to attract fish in the past. One such device is disclosed in U.S. Pat. No. 2,624,145 entitled Sound Producer for Fishing Apparatus which discloses a battery operated vibrator. The vibration is transmitted along the rod and line to the lure where it causes an audible tone which is intended to simulate the singing or droning tone of an insect. In U.S. Pat. No. 2,583,660 entitled Liquid Lure Ejecting Device Useful in Fishing there is disclosed a bulb placed adjacent the rod handle. The bulb may be squeezed to pump fish oil or the like through a tube running along the outside of the fishing rod into the water adjacet the end of the rod. U.S. Pat. No. 3,981,095 entitled Sport Fishing Apparatus discloses a motorized fishing rod which employs a motor to drive a flexible line for rotating a fishing lure while the rod is maintained still.

A number of hollow fishing rods have been used in the past which permit the fishing line to be disposed inside the pole to eliminate the line guides from the outside of the pole. See, for example, U.S. Pat. No. 3,862,509 entitled Eyeless Fishing Pole. One such hollow fishing rod is disclosed in U.S. Pat. No. 3,500,570 entitled Fishing Rod Pump Assembly. An airtight bladder is disposed inside the hollow rod. Air is pumped into the bladder by means of a manual bicycle-type pump extending from the end of the rod handle to regulate the stiffness of the fishing pole action. The disclosure indicates that, as the pressure inside the bladder is increased, the stiffness of the rod increases.

None of these devices disclose a hollow fishing rod equipped with a pump to pump air through the rod and discharge the air through a perforated tube to create bubbles under the surface of the water to attract a fish.

SUMMARY OF THE INVENTION

The present invention provides a fishing apparatus particularly suited for fresh water fishing and adapted to induce surface feeding fish such as bass or trout to readily approach the fishing lure used in connection with the apparatus. Although this apparatus is particularly suited for shallow water fishing for surface feeding fish, it can also be used in a variety of environments for a large variety of fish.

The present invention employs a hollow fishing rod into and along which air is pumped. A connector is supported on the end of the rod and provides fluid communication to the interior of the hollow rod. The pump may be connected to the rod by attaching a hose between the pump and this connector. It is preferable to use a portable, battery operated pump, however, any means for delivering air under pressure to the end of the rod may be used. In the preferred embodiment, a hollow fishing rod is used, however, it is equally possible to deliver air to the end of the fishing rod by means of a tube running along the outside of the fishing rod.

The air is discharged from the end of the rod in the form of bubbles to aerate the water and attract a fish. This may be accomplished with a perforated tube removably attached to the end of the fishing rod or some alternative aeration means which will be described subsequently. The tube usually extends coaxially with the fishing rod from the end of the rod. However, it may extend at any convenient angle. As the air is discharged through the perforated tube it will be diffused in such a way as to facilitate the formation of bubbles when the tip of the rod is under the water. This apparatus permits the water to be aerated near the tip of the rod to simulate the activity of a small fish.

A fishing lure is disposed near the end of the fishing rod by means of a fishing line which runs along the fishing rod through conventional eyelets and is attached to a conventional fishing reel mounted in a conventional way on a reel seat at the butt of the fishing rod. I prefer a single-action fly reel which includes a spring-loaded line holder with a ratchet lock and a release button on the side of the reel to wind up the line. When the fish strikes the lure, this reel will automatically reel in the line to hook the fish.

Mounted on the pole grip for the fishing rod is a switch which is electrically connected to a connector on the end of the rod. A cable may be used to connect the connector to the pump.

The fishing apparatus of the present invention is used by placing the tip of the fishing rod and the perforated tube which is attached to the end of the fishing rod a small distance under the surface of the water. The fisherman then activates the pump switch, which for convenience is located on the fishing pole grip, to pump air from the pump through the rod and out through the submerged perforated tube to create bubbles in the vicinity of the end of the rod to attract the fish. The fishing apparatus is usually used while the rod is moving relative to the water either by a swishing action of the rod or by the motion of the fisherman's boat in the water or by the motion created as the fisherman walks along the side of the bank of the body of water in which he is fishing.

The fishing apparatus also includes an optional lure stop which may be removably secured to the end of the rod and oriented at an angle, preferably about 90°, to the direction of orientation of the peforated tube. The lure stop extends a distance, preferably about six to eight inches, from the end of the rod and is intended to prevent the lure from getting entangled in the rod or with the perforated tube. The lure stop is particularly useful for the novice fisherman. The lure stop is hollow and arranged so that the fishing line is threaded through the lure stop and attached to a fishing lure. The diameter of the lure stop is small enough so that the lure will not enter inside but will be stopped at the end of the lure stop, away from the end of the pole or the perforated tube.

The pump is preferably housed in a watertight plastic case which may be attached to the fisherman's belt. The case also houses a battery pack which is electrically connected to the pump and may be used to power the pump in a remote location. Suitable connection means are provided through the case wall for recharging the battery pack. When the apparatus is being used in a boat where there is an available source of electric energy like the boat battery, the pump may be connected to that boat battery by means of a cable. A cable connection is provided through the wall of the case to permit direct connection of the pump to the boat battery by-passing the battery pack.

The capacity of the pump and the size and number of the holes in the perforated diffuser tube are coordinated so that the disturbance created by the fishing apparatus of the present invention will simulate the presence of a small fish feeding near the surface of the water so as to attract the desired fish. If the holes in the perforated diffuser tube are too small or the pressure is too large, the air will be forced into the water so as to shoot a spray of air into the water at a velocity that will create excessive turbulence. Care should be taken not to permit the turbulence to be so intense as to scare the fish away.

DESCRIPTION OF THE DRAWINGS

Other features and advantages of this invention will be apparent from the following description of certain embodiments thereof taken in conjunction with the following drawings in which:

FIGS. 4a, b, and c show the battery and pump container used in the present invention.

DETAILED DESCRIPTION OF THE PREFERRED EMBODIMENT

Figure 1:
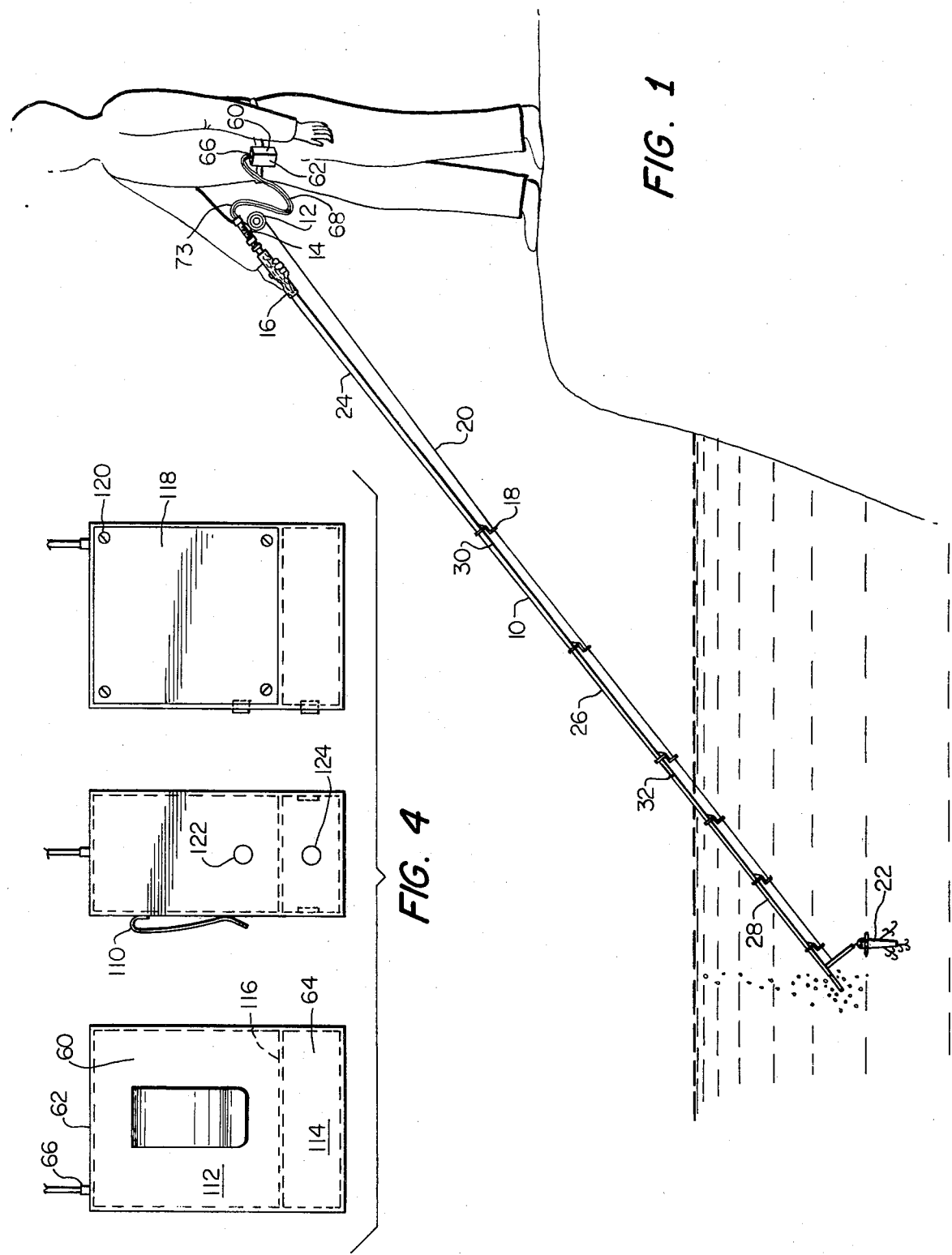
FIG. 1 shows a perspective view of the fishing rod of the present invention in use by a fisherman.

Referring now to FIG. 1, there is shown a fishing rod 10 to one end of which is affixed a fishing reel 12 by means of a conventional reel seat 14 preferably made of aluminum or some other suitable material. I prefer to use a single action fly reel with a spring loaded line holder with a ratchet lock inside and a release button on the side of the reel to wind up the line when a fish strikes. A cushioned pole grip 16, preferably made of cork or some other suitable material, is provided on the rod 10 adjacent reel seat 14 to provide a comfortable means for the fisherman to hold rod 10. A series of eyelets 18 are attached at convenient positions along the length of rod 10 for guiding fishing line 20 one end of which is wound around fishing reel 12 and the other end of which is attached to a fishing lure 22. I prefer a sinking fishing lure preferably made of plastic which includes a spinner and three sets of setting hooks with three hooks for each set or an appropriate number as the law allows for each State or locality.

Figure 3:
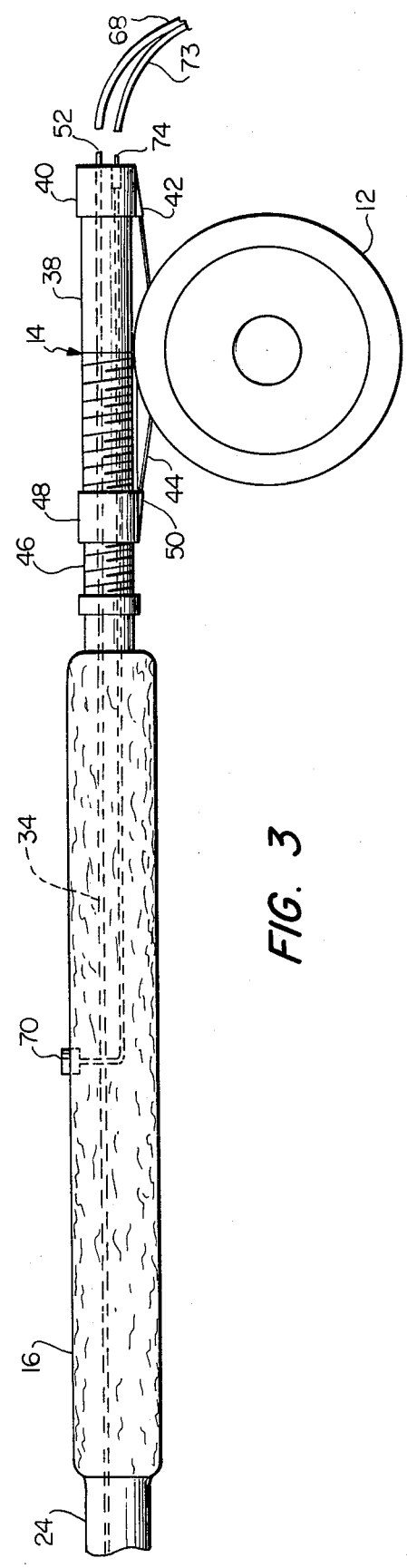
FIG. 3 shows a detail of another part of the fishing rod shown in FIG. 1.

Fishing rod 10 is hollow and is made preferably of fiberglass and comes in three sections 24, 26, and 28 connected in a conventional way at fittings 30 and 32 for easy assembly and disassembly. One end of pole grip 16 is connected to the end of section 24 of a fishing rod 10. As can be seen in FIG. 3, the other end of pole grip 16 is connected to a reel seat 14. Reel seat 14 includes a generally cylindrical tube section 38 one end of which is connected to pole grip 16 and the other end of which is surrounded and closed by a collar 40. Collar 40 is affixed to tube section 38. A portion 42 of collar 40 is flared away from tube 38 to provide a recess for accepting base portion 44 of reel 12. Axially extending threads 46 are disposed axially along a portion of reel seat tube 38. Annular collar 48 has internal threads 49 adapted to cooperate with threaded portion 46 so that when collar 48 is rotated, it will move axially along threaded portion 46. Collar 48 has a flared portion 50 for accepting base 44 of reel 12. Reel 12 is mounted on reel seat 14 by placing one end of reel base 44 in the flared portion 42 of collar 40 and then turning collar 48 so that its flared portion 50 also engages base 44 to securely mount fishing reel 12 to reel seat 14. A hollow tube 34 extends from fiberglass rod section 24 into and along pole grip 16 and reel seat 14 in a generally axial direction and is attached to connector 52 which is mounted in and extends through the end of collar 40.

Returning now to FIG. 1, there is shown an air pump generally designated as 60 enclosed in a watertight, break-resistant case 62 preferably made of high impact plastic. I prefer a 12 volt direct current ¾-inch twin piston fisherman's pump of the kind manufactured by Acqua Pump & Products Corporation, Queens Village, N.Y., also known as APPCO.

A 12 volt DC battery 64 is also enclosed in case 62 and is electrically connected to pump 60. I prefer to use nickel cadmium batteries, but any suitable battery can be used. Pump 60 communicates with a fitting 66 mounted through a wall of case 62. A plastic hose 68 connects pump fitting 66 to hose connector 52 so that when the pump is operating, air is pumped through hose 68 into tube 34 disposed through reel seat 14 and pole grip 16 into the interior of hollow fishing rod 10 and through sections 24, 26, and 28 of fishing rod 10. Fittings 30 and 32 are made so as not to obstruct the hollow opening completely through the rod. The tip of section 28 of rod 10 is also open so that the air exits through the end of rod 10.

Referring again to FIG. 3, there is shown an electric switch 70 mounted on pole grip 16 and adapted for convenient operation by the fisherman using the pole. A suitable electrical connector 74 is mounted through an opening in the closed end of collar 40. Connector 74 is connected by means of fully insulated wires extending through reel seat 14 and pole grip 16 and connected to switch 70. The electrical connections are fully insulated and sealed against contamination or corrosion by water, dirt, or other contaminants. Hose 68 also includes braided electrical cables 73 connecting pump 60 to connector 74. Switch 70 may, therefore, be used to switch pump 60 on and off as desired by the fisherman. Alternatively, switch 70 could be mounted on the outside of case 62 and connected through case 62 directly to pump 60 thus eliminating the need for cable 73 and connector 74.

Figure 2:
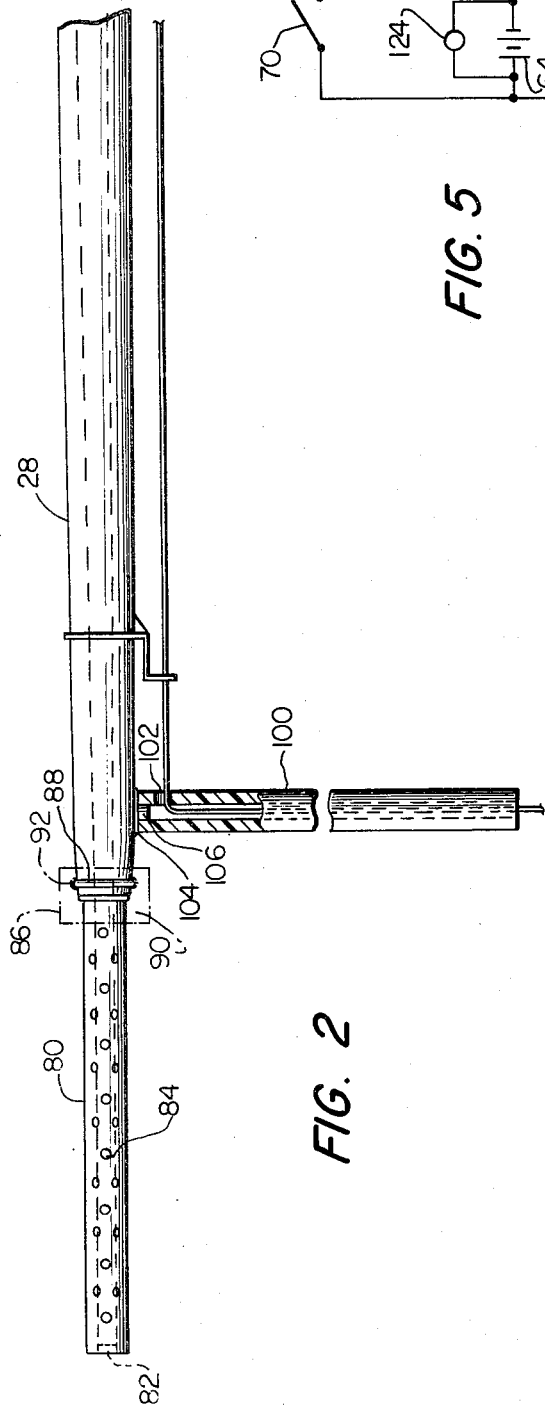
FIG. 2 shows a detail of the tip portion of the rod shown in FIG. 1.

Referring now to FIG. 2, there is shown a detail of the tip of rod 10. A hollow tube 80 extends from the distal end of rod section 28. The opening through hollow tube 80 is dimensionally compatible with the opening extending through and axially along hollow fishing rod 10. The distal end of tube 80 is plugged by means of a plug 82, or otherwise sealed. The walls of tube 80 are perforated by a number of holes 84 extending preferably radially through tube 80 from the hollow interior to permit the air which is pumped along hollow fishing rod 10 and into tube 80 to exit through holes 84. I have found that a three inch tube with 24 holes approximately 1/32 of an inch in diameter is satisfactory. However, any convenient number of holes of any convenient size may be used. It is also possible that the holes may be oriented in other than a radial direction. Alternatively, perforated tube 80 could be eliminated and plug 82 could be placed in the end of rod section 28 and holes 84 could be placed radially or at some convenient angle in the end of rod section 28. In a still further alternative, holes 84 could be oriented generally axially or at some convenient angle through plug 82 itself to provide passages for the air flow to exit from the rod and create bubbles. It is also possible to place an ordinary aeration screen, of the type used in kitchen faucets over the end of rod 10 and eliminate perforated tube 80.

Tube 80 may be attached to the distal end of rod section 28 by a variety of means. The confronting surfaces of tube 80 and rod section 28 may be bonded together. Alternatively, an annular collar 86 may be press fit about the end of rod section 28. The axial length of collar 86 is long enough to permit it to extend beyond the end of rod section 28 so that the portion of tube 80 adjacent the end of rod section 28 may be press fit inside the extending portion of collar 86 so as to join tube 80 and end section 28 of rod 10 together securely. In a further alternative, tube 80 may be removably attached to the end of rod section 28 by means of a snap-on fitting cooperatively disposed on the end section 28 and tube 80. In this alternative, end section 28 may have an annular ridge 88 extending around its circumference in the vicinity of the tip. The adjacent end of tube 80 may be fitted with a flange 90 whose inside diameter is slightly less than the diameter of the ridge 88. Inside flange 90 there may be an annular recess 92 with a diameter slightly greater than the diameter of ridge 88 so that when flange 90 is pushed over the end of rod section 28, ridge 88 snaps into recess 92 to hold tube 80 securely on to the end of rod section 28. In a still further alternative, tube 80 may be threaded on to the end of rod section 28 by means of coooperating threads disposed on tip 28 and tube 80.

Still referring to FIG. 2, there is shown lure stop 100 which is preferably a short hollow plastic tube extending a distance of preferably approximately 6 to 8 inches from the tip of rod section 28 and at an angle of about 90° to the axis of rod 10. Lure stop 100 is removably attached to rod section 28 between the end thereof and the last eyelet 18. There is an access hole 102 through the wall of lure stop 100 through which fishing line 24 is threaded and passed along hollow lure stop 100 and attached to fishing lure 22.

One method of connecting lure stop 100 to rod section 28 may be a snap-type connector which includes a cylindrical stub 104 bonded to the rod section 28 and extending a short distance substantially radially therefrom and including an annular ridge 106 about the circumference of the stub 104. A cooperating recess 108 on the inside of lure stop 100 will provide a snap connection when the lure stop 100 is pushed on to stub 104.

It is also possible that the lure stop need not be connected to the fishing rod at all. In this alternative, access hole 102 would be eliminated and the fishing line 20 would be threaded through the end of lure stop 100 and extend through lure stop 100 for connection to fishing lure 22. The purpose of lure stop 100 is to keep the lure separated from perforated tube 80 so that the fishhooks on the lure stop do not get entangled in the perforations on perforated tube 80 or with the end of the fishing rod 10. The lure stop is particularly useful for the novice fisherman and may not be necessary for a skilled fisherman.

Referring now to FIG. 4, there is shown a case 62 for pump 60 and battery 64. Case 62 is preferably made of watertight break-resistant plastic and includes a belt clip 110 for attaching the container to the fisherman's belt. Case 62 is divided into two chambers 112 and 114 by wall 116. Pump 60 is disposed in chamber 112. I prefer a 12 volt direct current pump with a single or dual ¾ inch cylinders operable from a self-contained 12 volt direct current motor. This kind of pump is commonly known as a "fisherman's pump." The capacity of the pump may be varied by means of controls on the pump and provides a minimum flow rate of 200 grams of air per minute and a maximum flow rate of approximately 300 grams of air per minute. This flow of air, when delivered through hose 68, tube 34, through hollow fishing rod 10 to perforated tube 80 will cause an appropriate disturbance in the water when tube 80 is submerged below the surface for attracting the fish. The inside diameter of the hole through fishing rod 10, tube 34, and hose 68 are approximately ⅛ of an inch. Using approximately 24 holes of approximately 1/32 of an inch diameter in tube 80 provides a satisfactory result. Other combinations of pump flow rate, inside diameter, and number of holes could, of course, work satisfactorily. The number and size of holes is directly related to the flow rate produced by the pump. If the holes 84 in perforated tube 80 are too small, the air will shoot out in a spray at a velocity which is apt to create too much turbulence and scare the fish away. Likewise, if the holes are maintained the same size but the flow rate and pressure of the pump is increased, the same undesirable amount of turbulence may occur.

Chamber 112, in which the pump 60 is housed, includes a removable cover 118 which is held in place by screws 120 to permit repair or replacement of pump 60. A cable connection 122 is provided in the side wall of casing 62 into chamber 112. The pump is electrically connected to this cable connection 122. Pump 60 may be electrically connected to a 12 volt battery on board a boat. An alternative power supply is provided inside chamber 114 of case 62 which includes two rechargeable 12 volt, direct current nickel cadmium batteries 64. These batteries may be recharged from a standard 12 volt direct current battery or from a 120 volt alternating-current transformer. Chamber 114 is water-tight to protect the batteries from deterioration during use or storage. A cable socket connection 124 is provided through the wall of case 62 into chamber 114 to provide a means for recharging the batteries. This alternative power source for the pump adds to the convenience of the apparatus.

Figure 5:
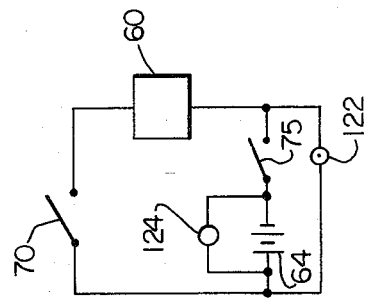
FIG. 5 shows the electric circuit used with the invention shown in FIG. 1.

An electrical circuit for the battery-powered pump is shown in FIG. 5 where batteries 64 are connected in series with pump 60 and switch 70 so that when switch 70 is closed, batteries 64 will power pump 60 and force a flow of air through hose 68, tube 34, hollow rod 10 and out through holes 84 in perforated tube 80. This is particularly suited for remote operation. Connector 124 is shown by which batteries 64 may be recharged in a conventional manner. When the apparatus is being operated in a remote fashion by batteries 64, switch 75 is closed to provide a complete circuit. Alternatively, batteries 64 and their associated electrical connections may be located on rod 10 for example inside cylindrical tube section 38.

If it is desired to connect the pump to an available boat battery, switch 75 is opened and pump 60 is connected to the boat battery (not shown) by means of a cable connected to connection 122. Thus, this circuit provides for operating the pump remotely or from a source of available power on a boat.

In operation, the fisherman may attach case 62 to his belt by means of clip 110, connect one end of hose 68, which also includes electrical cables 73 to fitting 66 on case 62 and connect the other end of hose 68 to hose connection 52 and connect the electrical cables to electrical connector 74. This will complete the electrical circuit for the operation of pump 60 by means of switch 70 on pole grip 16. The fisherman will then use one hand to hold rod 10 by means of pole grip 16 with his thumb placed conveniently on switch 70. Fishing reel 12 is mounted on pole seat 14 and fishing line 20 extends from fishing reel 12 through eyelets 18 through opening 102 in lure stop 100, through lure stop 100 and is attached to lure 22. Lure 22 is disposed about 6 to 8 inches from the tip of rod 10. Perforated tube 80 is disposed on the tip of end section 28 of rod 10 so that air may flow from pump 60 through hose 68, tube 34, and through hollow rod 10 into perforated tube 80 and out through holes 84 when switch 70 is closed to operate pump 60.

The fisherman may take up a position in the water or in a boat and place the tip of the fishing rod slightly under the surface of the water so that tube 80 and fishing lure 22 are completely submerged under the surface of the water. When pump 60 is actuated, air will be emitted from perforated tube 80 to aerate the water and create bubbles. These bubbles are intended to create a disturbance in the water to attract a fish, particularly a surface feeding fish like bass or trout. It is intended that when the fish sees the spray of air bubbles plus lure 22, it will be attracted to investigate a promising feeding spot. This aeration is usually intended to be intermittent and the skill of the fisherman will determine at what intervals aeration should be initiated. Aeration should not be so great and so severe as to create excessive turbulence to scare a fish away. The fisherman may also swish the rod back and forth under the surface of the water so that the fishing lure and the tip of the rod will move together to create the impression of a small fish feeding near the surface of the water. When a fish strikes the lure, automatic reeling action will beging to hook the fish. The fisherman may be stationed in a boat moving up or down stream. The fisherman may choose to wade up or down along the edge of the water.

Although this fishing apparatus is particularly designed for catching surface feeding fish in shallow water, it may also be used in other environments. It will be appreciated that the present invention provides a novel apparatus for attracting the fish to you.

If the fisherman fishes from a boat, it is possible to connect the pump directly to a 12 volt battery that may be used on the boat for operating other apparatus.

Lure stop 100 may be used to space fishing lure 22 away from the end of fishing rod 10 and away from perforated tube 80 so as to minimize the possibility of fishing lure 22 or its hooks becoming entangled. An experienced fisherman may find that it is unnecessary to use lure stop 100. Whether lure stop 100 is used or not, lure 22 is usually maintained 6 to 8 inches away from the tip of rod 10. Fishing line 22 is preferably about twice the length of rod 10, the excess line being wound about the fishing reel.

Those skilled in the art will appreciate that many modifications and variations can be made to the invention as described in this preferred embodiment without departing from the spirit of the invention. It is, therefore, intended that my invention not be limited to this preferred embodiment, but be limited only as set forth in the appended claims.

I claim:

1. A fishing apparatus comprising;

a pole;

means for delivering a flow of air under pressure to the distal end of said pole; and perforated aeration means associated with said pole in fluid communication with said delivery means and including a plurality of perforations; whereby when said aeration means is placed under the surface of the body of water in which the fishing apparatus is being used, a stream of bubbles emanates from said aeration means to create a diversion for attracting a fish.

2. The fishing apparatus of claim 1 further including means for providing a source of air under pressure to said delivery means.

3. The fishing apparatus according to claim 2 wherein said means for providing a source of air pressure includes a portable pump remote from said pole and connected to said delivery means by tubing and adapted to be operated by a portable source of electric power; and, further including switching means mounted on said pole and electrically connected to said pump for selectably energizing said pump.

4. The fishing apparatus according to claim 3 wherein said portable pump is a variable flow rate pump.

5. The fishing apparatus of claim 1 further including a lure stop which comprises a hollow tube having a substantially radial opening through the wall thereof for providing a passage through which a fishing line may be threaded to pass along and out of said lure stop for connection to a fishing lure;

connection means associated with one end of said tube for connecting said lure stop to said fishing pole in the vicinity of the distal end thereof;

said lure stop providing a means for spacing said lure from the end of said fishing pole so that the lure will not become entangled with the end of the pole or said aeration means.

6. A fishing apparatus comprising:

a hollow fishing pole;

a pole grip axially aligned with and affixed to an end of said pole;

a reel seat axially aligned with and affixed to the free end of said pole grip and including:

a hollow tubular section;

a collar enclosing the butt end of said hollow tubular section;

means for providing fluid communication from the inside of said hollow fishing pole through said pole grip and said reel seat; and, connecting means supported by and providing fluid communication through said collar and adapted for connection to a source of air under pressure.

7. The fishing apparatus of claim 6 further including electric switching means mounted on said pole;

electric connection means supported by said collar and adapted for electrical connection to an electric circuit; and, electric transmission means providing an electrical connection between said switch and said connector.

8. A fishing apparatus comprising:
a hollow pole through and along which air under pressure may be delivered to the distal end of said pole;
a connection means supported on said pole and in fluid communication with the opening running through said hollow pole;
a flexible hose adapted for connection to said connection means and for delivering air under pressure to the hollow interior of said pole; and,
aeration means associated with said pole and fluid communication with said opening running through said hollow pole; whereby when said aeration means is placed under the surface of the body of water in which the fishing apparatus is being used, bubbles emanate from said aeration means to create a diversion for attracting a fish.

9. A fishing apparatus comprising:
a pole;
means for delivering a flow of air under pressure to the distal end of said pole;
a portable pump adapted to be operated by a portable source of electric power; and,
further including switching means mounted on said pole and electrically connected to said pump for selectively energizing said pump;
a water-tight break-resistant case defining a first and a second chamber:
wherein said pump is disposed in said first chamber:
a battery pack disposed in said second chamber and electrically connected to said pump;
said casing including a coupling in fluid communication with said pump through which said air under pressure is delivered from said pump to said delivery means;
aeration means associated with said pole in fluid communication with said delivery means;
whereby when said aeration means is placed under the surface of the body of water in which the fishing apparatus is being used, bubbles emanate from said aeration means to create a diversion for attracting a fish.

10. A fishing apparatus comprising:
a hollow pole through and along which air under pressure may be delivered to the distal end of said pole;
connection means supported on said pole and in fluid communication with the opening running through said hollow pole;
a flexible hose adapted for connection to said connection means that for delivering air under pressure to the hollow interior of said pole;
aeration means associated with said pole and fluid communication with the opening running through said hollow pole and including:
a hollow tube, one end of which is in fluid communication with the opening through said hollow pole and the other end of which is plugged;
the walls of said hollow tube including a plurality of perforations extending therethrough to permit the air delivered to the distal end of said pole to exit through said perforations so that when the perforated hollow tube is placed under the surface of the water bubbles will emanate therefrom to create a diversion for attracting a fish.

11. The fishing apparatus according to claim 10 further including snap connector means for removably connecting said perforated tube about the distal end of said fishing pole.

* * * * *